(12) United States Patent
Light et al.

(10) Patent No.: US 8,191,272 B1
(45) Date of Patent: Jun. 5, 2012

(54) PROTRACTOR APPARATUS

(76) Inventors: Chryl Light, Salinas, CA (US); Roberta J. Guarnieri, Los Angeles, CA (US)

(*) Notice: Subject to any disclaimer, the term of this patent is extended or adjusted under 35 U.S.C. 154(b) by 0 days.

(21) Appl. No.: 13/068,200

(22) Filed: May 4, 2011

(51) Int. Cl.
   *B43L 7/10* (2006.01)
(52) U.S. Cl. .................. 33/471; 33/424; 33/465
(58) Field of Classification Search .......... 33/471, 33/424, 468, 465, 403, 495
   See application file for complete search history.

(56) References Cited

U.S. PATENT DOCUMENTS

| | | | |
|---|---|---|---|
| 2,438,337 A * | 3/1948 | Gordon | 33/27.03 |
| 3,416,232 A * | 12/1968 | Overbay | 33/424 |
| 4,608,939 A * | 9/1986 | Lampley | 33/562 |
| 5,113,590 A | 5/1992 | Shapiro et al. | |
| 5,117,560 A * | 6/1992 | Nevins | 33/471 |
| 5,335,423 A * | 8/1994 | McLaughlin | 33/647 |
| 5,408,753 A * | 4/1995 | Hong | 33/430 |
| 5,557,996 A | 9/1996 | Reber et al. | |
| 5,588,218 A * | 12/1996 | Barry et al. | 33/471 |
| D402,217 S | 12/1998 | Taylor | |
| 6,427,344 B1 * | 8/2002 | Smith et al. | 33/27.032 |
| 6,457,247 B1 | 10/2002 | Lin | |
| D502,115 S * | 2/2005 | Chudek et al. | D10/65 |
| D557,153 S * | 12/2007 | Light et al. | D10/65 |
| 7,325,325 B2 * | 2/2008 | Gleeson | 33/563 |
| 7,523,562 B2 * | 4/2009 | Sargeant | 33/640 |
| 7,798,091 B2 * | 9/2010 | Suita et al. | 116/287 |
| 2002/0069540 A1 * | 6/2002 | Smith et al. | 33/27.032 |
| 2004/0255480 A1 * | 12/2004 | Gleeson | 33/563 |
| 2005/0210688 A1 * | 9/2005 | Stephens | 33/1 N |
| 2006/0070252 A1 * | 4/2006 | Verdura et al. | 33/494 |
| 2006/0213069 A1 * | 9/2006 | Martin | 33/286 |
| 2008/0078092 A1 * | 4/2008 | Lin | 33/471 |
| 2008/0223191 A1 * | 9/2008 | Sargeant | 33/483 |

* cited by examiner

*Primary Examiner* — Yaritza Guadalupe-McCall
(74) *Attorney, Agent, or Firm* — William W. Haefliger

(57) ABSTRACT

An improved protractor with an adjustable narrow arm comprising, in combination a flat, generally planar body having protractor shape, including an angle indicating scale with protruding scale elements in a curved row, the marker arm pivotally carried by the body to be swung successively over the scale elements, the scale elements spaced apart sufficiently to frictionally maintain the marker in selected angle indicating positions relative to said body.

10 Claims, 5 Drawing Sheets

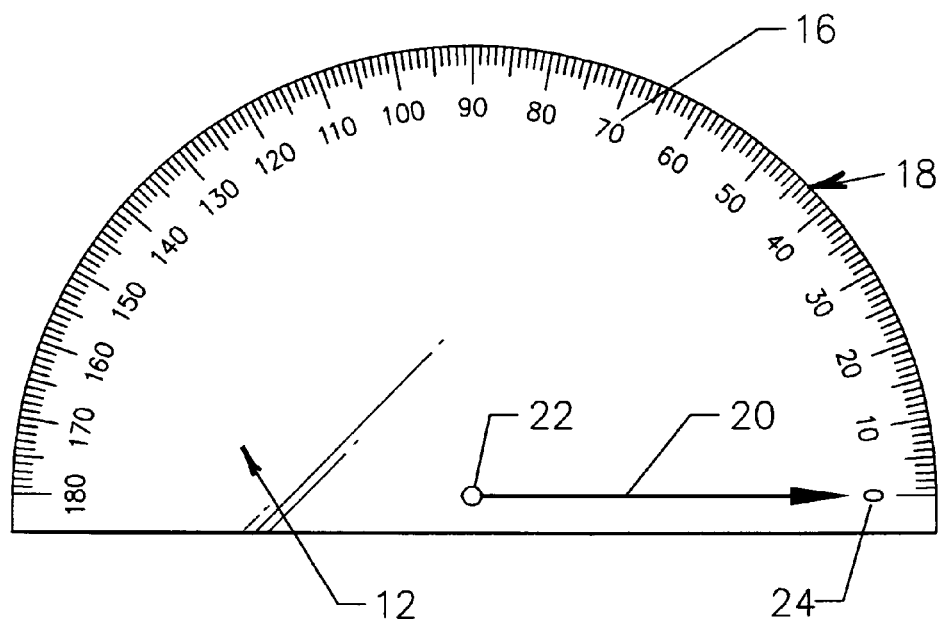
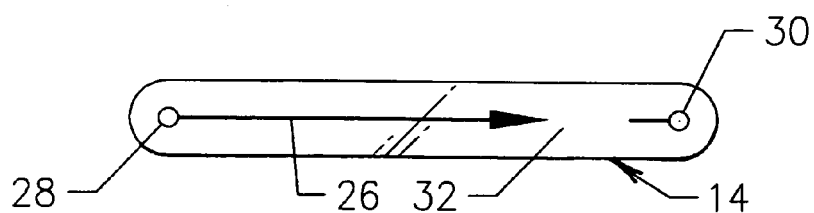

PROTRACTOR APPARATUS

BACKGROUND OF THE INVENTION

This invention relates generally to the construction and operation of protractors, and more particularly to improvements in protractor marker arm swiveling and positioning relative to a flat semi-circular base, as for example enhances teaching and use of protractors.

There is need for protractors that are simple, instructive, and that have marker arms that are easy to use and maintain in selected positions as during angle indication and measurement.

SUMMARY OF THE INVENTION

It is a major object of the invention to provide an improved protractor having, in combination:

a) a flat, generally planar body having protractor shape, including an angle indicating scale with protruding scale elements in a curved row, b) said marker arm pivotally carried by the body to be swung successively over the scale elements, c) the scale elements spaced apart sufficiently to frictionally maintain the marker in selected angle indicating positions relative to said body.

Another object is to provide a marker arm that extends lengthwise beyond the scale elements and beyond a curved outer edge defined by the planar body. In this regard, a through opening may typically be provided in an outer portion of the arm projecting beyond said curved outer edge.

Yet another object is to provide a first straight indicator line on the marker arm, in alignment with an arm pivot axis and the through opening in the arm end extent. A second straight indicator line may be provided on the body to extend in alignment with that axis and a zero scale element on the body. The arm and/or body may be transparent to enable use of such indicator lines in relation to an angle subject to measurement.

Another object is to provide gaps between protruding scale elements to facilitate arm movement; and there typically being camming edges on the scale elements to be frictionally engaged by the marker arm as it is swung. Such edges may be sloped to slightly and repeatedly lift the marker arm as it is swung over the gaps and over the scale elements.

A further object include means on the body for pivotally supporting the marker arm and providing limited frictional resistance to marker pivoting.

These and other object and advantages of the invention, as well as the details of an illustrative embodiment, will be more fully understood from the following specification and drawings, in which:

DRAWING DESCRIPTION

FIG. 2 is a depiction of the top plan view of the semi-circular base of FIG. 1;

FIG. 3 is a depiction of the top plan view of the movable arm of FIG. 1;

BACKGROUND OF THE INVENTION

Figure 1:
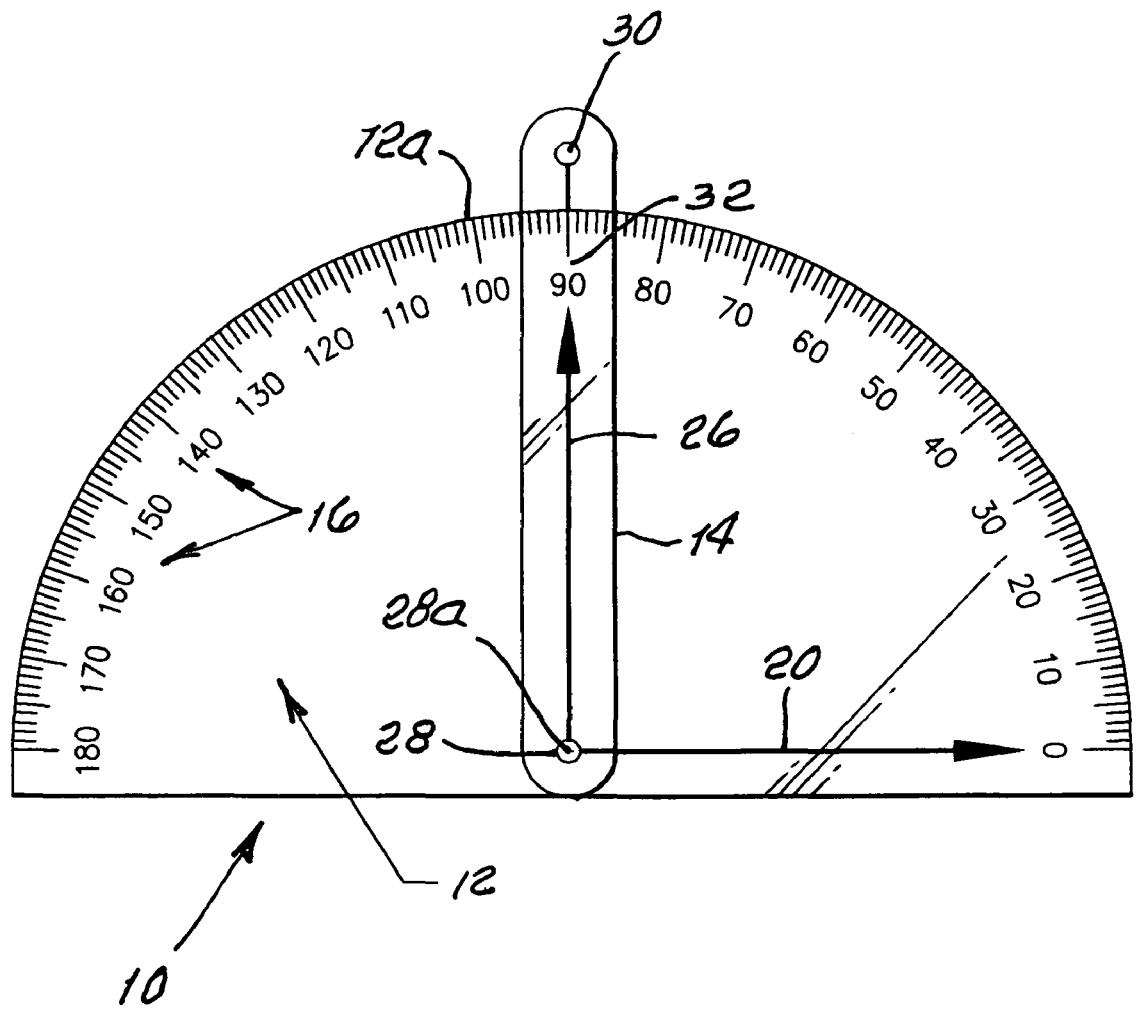
FIG. 1 is a depiction of, a top plan view of a preferred form of the invention.
Figure 4:
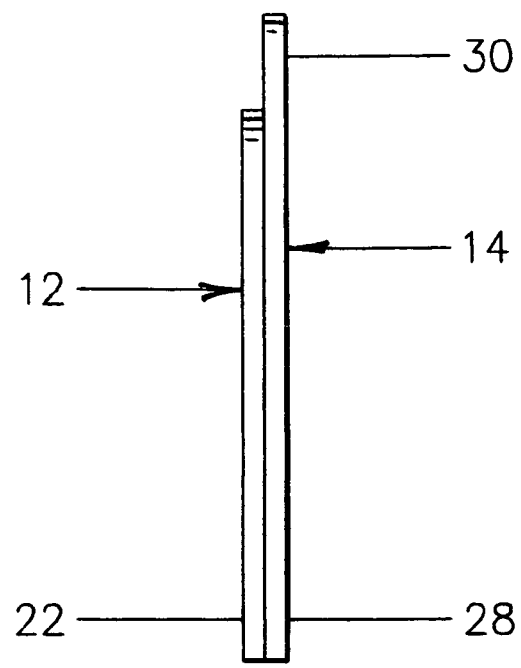
FIG. 4 is a depiction of a side view of FIG. 1.
Figure 5:
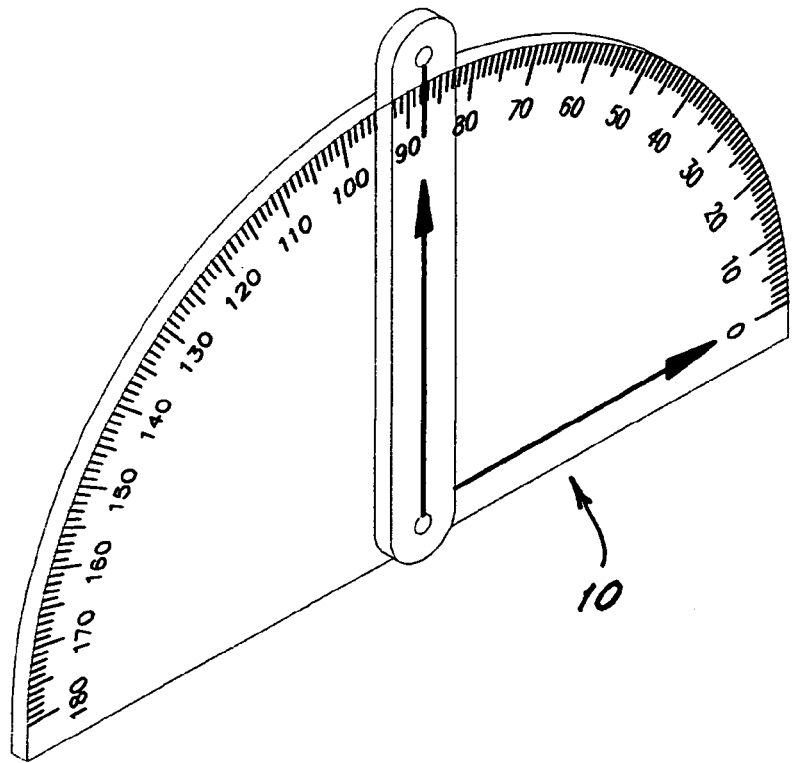
FIG. 5 is a depiction of a perspective view of FIG. 1.
Figure 6:
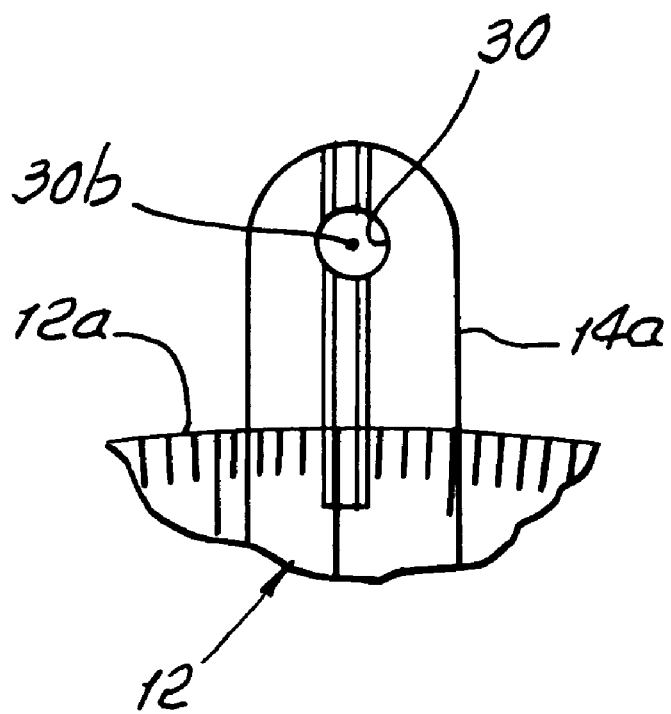
FIG. 6 is an enlarged section showing a through hole in the marker end portion.

Referring to FIGS. 1 through 5, the protractor device 10 includes a body 12 in the form of a semi-circle and at least one swingable marker arm 14. Each of these is typically made of a translucent material, preferably transparent. The semi-circle body 12 is marked with a degree scale 16 consisting of raised elements 16a from 0 to 180 degrees, angle indicia 18, and straight line 20 extending from a hole 22 to the origin at 0 of the degree scale 16. The movable arm 14 is marked with a straight line 26 from first hole 28 at pivot axis 28a to a second hole 30, situated beyond semi-circle edge 12a of body 12. There is a break 32 in the line 26 so that the underlying degree scale 16 at the edge of semi-circle 16 can be read through transparent arm 14. The movable arm 14 is attached to the flat body 12 by axially aligning the hole 22 in the body with the first hole 28 in the arm, using a grommet 30 or other attachment device that allows the movable arm 14 to pivot about the axis 28a, with slight frictional resistance to rotation in or to selected position.

The manner of using the protractor device 10 is as follow: To measure an angle, the line 20 on the semi-circle 12 and the line 26 on the movable arm 14 should be aligned with each of the respective sides of the angle being measured. The reading on the degree scale 16 that appears in the break 32 in the line 26 corresponds to the number of degrees in the angle being measured.

To mark a specific angle, the first side of the angle should be drawn using a straight edge. The protractor should be placed so that the line 20 on the body 12 is aligned with the first side of the angle. A mark with a pencil or other marking device can be made at the first hole 28 in the arm to represent the vertex of the angle. The movable arm is then rotated until the desired number of degrees is shown in the break 32 of the line 26. A mark with a pencil or other marking device can be made at the second hole 30 at the protruding end 14a of the movable arm 14. When the protractor device is removed, a line can be drawn with a straight edge from the mark made at the vertex of the angle to the mark 30b made at hole 30 at the end of the movable arm 14, to form the second side of the angle.

It will be understood that the scale elements 16a are spaced apart sufficiently as by gaps to frictionally engage and maintain the marker in selected angle indicating positions relative to said body.

Figure 7:
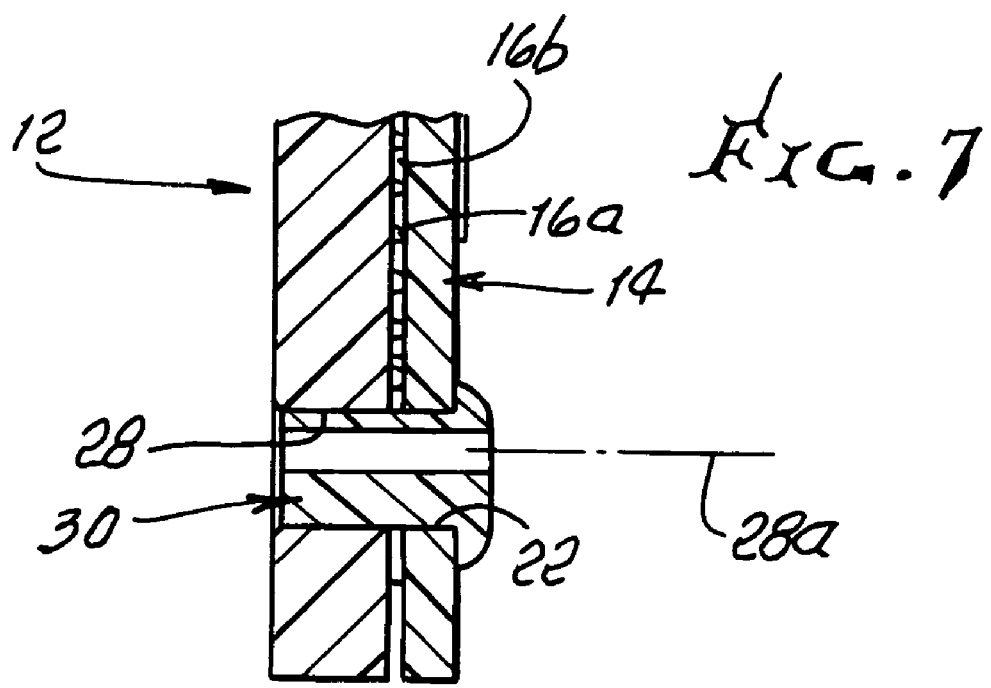
FIG. 7 is an enlarged section showing pivotal connection of the marker to the protractor body, and marker engagement with scale elements.

In this regard, note the indicated gaps 16b between successive raised or protruding scale elements 16a, and element upper surfaces 16c, frictionally engaged by the underside of the marker. See FIGS. 7 and 8. The loci of engagement of the arm with said elements is less than gap width, whereby the arm remains in frictional engagement with at least one of said elements, as the arm is pivoted, and there is always sufficient friction to somewhat resist arm pivoting, while the gaps assist visual delineation between successive scale elements, assisting visual positive readout. Surface 16c may have coloring different from that of 12 and 16b at 16b'.

Figure 8:
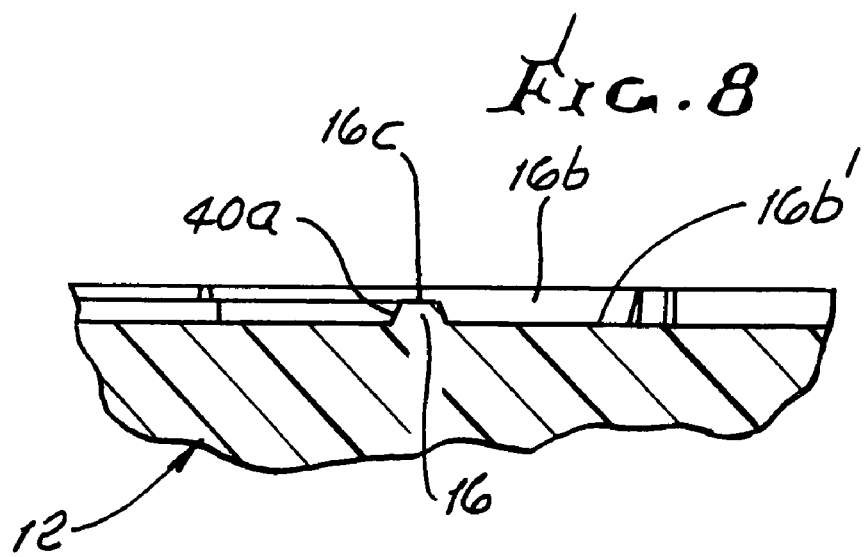
FIG. 8 is an enlarged section showing scale element sloping engagement with marker under surface.

FIG. 8 also shows sloped or tapered flanks 40a of successive raised scale elements 40 with the gaps 16b between such tapered flanks. Such tapering forms camming edges that assist pivoting marker riding onto and over the upper surfaces 16c of the elements.

Such tapering is between 5° and 20°, for best results. The locus of engagement is substantially less than gap width, between successive elements, for ease of pivoting during such engagement.

Figure 9:
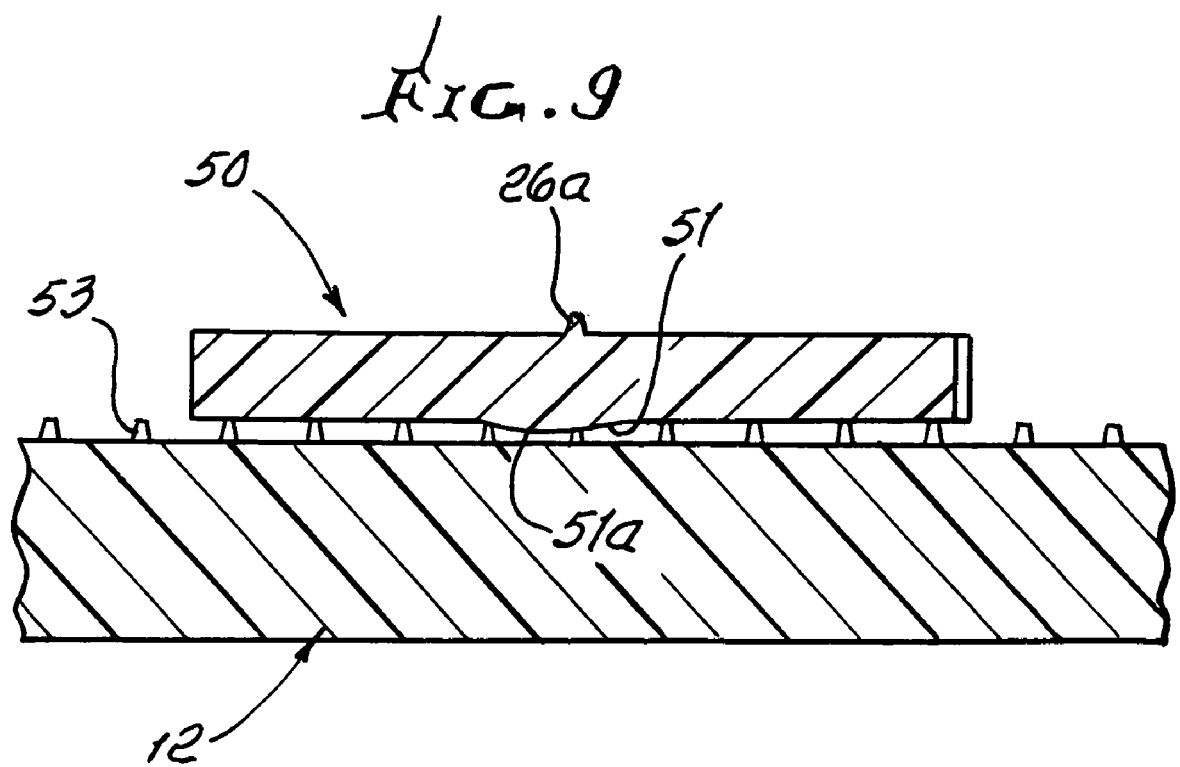
FIG. 9 is an enlarged section showing marker undersurface sloping.

FIG. 9 shows a modified arm 50 having an under surface portion 51 protruding downwardly, shallowly and convexly, to present a shallow engagement surface 51a that provides smooth camming engagement i.e. bulge with successive of the raised scale elements 53, over which the arm rides. Elements 53 have tapered flanks, as described. Also, the slight lifting of the resilient arm as it rides over the elements provides the user with finger sensing of ride-over of successive elements, to co-ordinate with visual observation, for more positive and accurate positioning of the arm and angular indicating lines. For example, the bulging surface portion can come to rest, between successive raised scale elements, when the indicator line on the marker exactly aligns with a scale element, or the center thereof; and the arm may have resilient springiness to hold that arm position.

As before, for measuring an angle, align the two lines 20 and 26 on the protractor with the sides of the angle being measured and read the scale. The line on the rotating arm extends the line of the printed angle and points to the number of degrees on the scale that corresponds to the measure of the angle.

To draw an angle, first draw a straight line using the bottom edge of the protractor as a guide. Then align the hole in the center of the protractor to one end of the straight line. Then move the rotating arm to the desired number of degrees and make another mark in the hole at the end of the rotating arm. Use the bottom edge of the protractor to draw a second line connecting the end of the first line with the marked point.

The body may be provided with colored portions to help students classify angles as acute (yellow), obtuse (blue), or right angles (where the yellow and blue meet).

In FIG. 9, line 26 is formed by thin ridge 26a on marker arm 50 that corresponds to arm 14.

We claim:

1. An improved protractor with an adjustable narrow arm comprising, in combination:
   a) a flat, generally planar body having protractor shape, including an angle indicating scale with protruding scale elements in a curved row,
   b) said marker arm pivotally carried by the body to be swung successively over the scale elements,
   c) the scale elements spaced apart sufficiently to frictionally maintain the marker in selected angle indicating positions relative to said body,
   d) there being gaps between the protractor scale elements,
   e) and there being camming edges on the scale elements to be frictionally engaged by the marker arm as it is swung.

2. The combination of claim 1 wherein said camming edges are sloped to lift the marker arm as it is swung over the gaps and over the scale elements.

3. The combination of claim 1 including means on the body for pivotally supporting the marker arm and providing limited frictional resistance to marker pivoting.

4. The combination of claim 1 wherein the arm has an undersurface portion protruding downwardly, shallowly and convexly to provide smooth camming engagement with successive of the elements, for arm positioning delineation relative to successive scale elements.

5. The combination of claim 1 wherein the marker arm extends lengthwise beyond the scale elements and beyond a curved outer edge defined by the planar body.

6. The combination of claim 5 including a through opening in an outer portion of the arm projecting beyond said curved outer edge.

7. The combination of claim 5 wherein the arm has a pivoting axis, and there being a first straight indicator line on the marker arm in alignment with said axis and said through opening.

8. The combination of claim 7 wherein there is a second straight indicator line on the body extending in alignment with said axis and a Zero scale element.

9. The combination of claim 7 wherein the line defines a first break overlying the scale elements as the marker is pivoted, the arm being transparent under that break.

10. An improved protractor with an adjustable narrow arm comprising, in combination:
    a) a flat, generally planar body having protractor shape, including an angle indicating scale with protruding scale elements in a curved row,
    b) said marker arm pivotally carried by the body to be swung successively over the scale elements,
    c) the scale elements spaced apart sufficiently to frictionally maintain the marker in selected angle indicating positions relative to said body,
    d) there being gaps between the protractor scale elements,
    e) and wherein the loci of engagement of the arm with said elements is less than gap width, whereby the arm remains in frictional engagement with at least one of said elements, as the arm is pivoted.

* * * * *

UNITED STATES PATENT AND TRADEMARK OFFICE
CERTIFICATE OF CORRECTION

Page 1 of 1

PATENT NO. : 8,191,272 B1
APPLICATION NO. : 13/068200
DATED : June 5, 2012
INVENTOR(S) : Chyrl Light and Roberta J. Guarnieri It is certified that error appears in the above-identified patent and that said Letters Patent is hereby corrected as shown below:

On Title page, (76) Inventors: "Chryl Light, Salinas, CA (US); Roberta J. Guarnieri, Los Angeles, CA (US)" should read --Chyrl Light, Salinas, CA (US); Roberta J. Guarnieri, Los Angeles, CA (US)--.

Signed and Sealed this
Fourteenth Day of August, 2012

David J. Kappos
*Director of the United States Patent and Trademark Office*